3,384,756
PEAKED MONOCHROMATOR HAVING A SHARPLY BLAZED DIFFRACTION GRATING WHICH IS ALWAYS OPERATED AT THE PEAK OF THE BLAZE
Maurice F. Hasler, Montecito, and James B. Nicholson, Goleta, Calif., assignors to Applied Research Laboratories, Inc., Glendale, Calif., a corporation of Delaware
Filed Apr. 21, 1965, Ser. No. 449,781
9 Claims. (Cl. 250—51.5)

ABSTRACT OF THE DISCLOSURE

A spectrometer having a sharply blazed diffraction grating is operated always at the peak of the blaze by maintaining a difference equal to twice the blaze angle between the input angle and the output angle. For grazing incidence work with X-rays, the apparatus is also arranged so that the input radiation strikes the blazed facets of the grating at an angle smaller than the critical angle of total external reflection.

Brief summary

This invention relates to novel spectrographic methods and apparatus, and more particularly, to a novel method of and apparatus for operating a scanning monochromator or spectrograph of the type having a sharply blazed diffraction grating for dispersing incident radiation in accordance with its wavelength.

Diffraction gratings may take many different forms. All of them disperse incident radiation in accordance with the well known laws of wave interference. When white light, for example, is directed through the primary slit of a monochromator upon a grating, the grating disperses the light into several spectra, which are conventionally numbered as orders in accordance with the value of $n$ in the classical grating equation:

$$n\lambda = d(\sin \theta_1 \pm \sin \theta_2)$$

where:
$n$ is an integer called the order number of the spectrum, $\lambda$ is the wavelength of the particular part of the incident radiation under consideration,
$d$ is the grating constant, i.e., the distance on centers between successive diffracting elements of the grating,
$\theta_1$ is the input angle measured from the normal to the grating,
$\theta_2$ is the output angle measured from the normal to the grating, and
the sign is selected to be negative if the output angle lies on the opposite side of the normal to the grating from the input angle, and to positive if the two angles are on the same side of the normal.

Gratings of the type with which the present invention is primarily concerned are those that comprise an array of microscopically spaced, parallel grooves on an optical surface, which may be flat or curved. Incident radiation reflected or refracted by the grooves is also diffracted because of the narrowness of the grooves, hence the name diffraction grating. For convenience, the directions in which radiation would be reflected or refracted by a selected wall of a typical one of the grooves, considered by inself are called the specular directions.

Then entire output of grating is subject to the laws of interference, which govern the dispersion, but the output is most intense in the specular directions.

Often in the manufacture of a grating, one side wall, or facet of each groove is made as smooth as possible, and its shape is controlled to limit the specular directions and thereby to concentrate the output of the grating in a selected range of directions called the blaze.

The greatest concentration may be achieved when the burnished facets of the grooves are made as flat as possible, in which case the grating is said to be sharply blazed, and the angle between the burnished facets of the grooves and the plane of or tangent to the grating is called the blaze angle. For a given angle of incidence, a sharply blazed grating works at maximum efficiency over only a small range of directions, which is called the peak of the blaze.

In some gratings heretofore the burnished facets have been curved in order to broaden the blaze and to make the efficiency of the grating more uniform over a relatively large range of directions. In this case, however, the maximum efficiency achievable is less than in cases where the facets are flat.

The present invention pertains to the use of a sharply blazed grating of the hereinabove stated type in a monochromator or scanning type spectrograph. It has now been found that an instrument of this type may be operated in such a way that the peak of the blaze is swept through the entire spectral range of the monochromator synchronously with the scanning motion of the instrument. The effect may be expressed as operating at the peak of the blaze through the entire scan of the monochromator. Thus, the efficiency of the monochromator is maximized at all settings.

Very often, the radiaiton being analyzed is weak compared to so-called noise. In these cases, the resolution of the monochromator is limited by the strength of the output radiation relative to the noise, and the resolving power of the monochromator is said to be power limited. In these cases, the practice of the invention also serves to maximize the resolving power of the monochromator at all settings.

A further feature of the invention pertains to the use of diffraction gratings in monochromators for analyzing radiation in the soft X-ray region, where the phenomenon of so-called total external reflection is encountered. It has now been found that by appropriate control of the angle of incidence in relation to the blaze angle of the grating and the critical angle of reflection, and operating according to the hereinabove mentioned principle of the invention, always at the peak of the blaze, a monochromator having a grating as its dispersing element may be operated in this region of the spectrum at heretofore unattainable efficiencies.

Heretofore, in this region of the spectrum, great difficulty has been encountered in distinguishing between the radiation it is desired to detect, usually in the first order spectrum, and shorter wavelength radiation of the second and higher orders that is ordinarily dispersed in exactly the same directions.

In the practice of the invention this problem is overcome to a hgih degree, because radiation of the second and higher orders is absorbed or transmitted through the grating, instead of being dispersed along with the energies of interest, thus enabling the achievement of a very high degree of discrimination against energies of higher orders than the desired one.

Various aspects and advantages of the invention will now be described in connection with the accompanying drawings, wherein.

Briefly, the invention contemplates the method of operating a monochromator, or scanning spectrograph having a sharply blazed diffraction grating as its spectrum dispersing element, in such a way that for each wavelength of interest the condition for constructive interference, i.e., the classical grating equation is satisfied at the peak of the blaze. In cases where the grating is reflective, this is accomplished by making the output angle, $\theta_2$ in the classical grating equation, differ from the input angle, $\theta_1$, by twice the blaze angle of the grating, taking into account the necessary mathematical sign relationships, which will be readily apparent from the diagram of FIG. 1. The principle is the same for transmission type gratings, but takes the law of refraction, instead of the law of reflection into account. Thus, for transmission gratings having small blaze angles, the output angle, in accordance with the invention is made to differ from the input angle by approximately the product of $u-1$ times the blaze angle, where $u$ is the refractive index of the grating.

Adjustment of the input angle alone causes the radiation of interest to be dispersed at the peak of the blaze. Adjustment, or selection of the output angle enables the detection of the radiation of interest in the usual way through a secondary slit and discrimination against radiation of other wavelengths.

In general, instruments of the type to which the invention pertains include a primary slit, a secondary slit, and a grating. The practice of the invention requires that two of these three basic elements be moved relative to the third and to each other to shift from one wavelength setting to another. This contrasts with previous methods of operating instruments of this type, whereby only one of the elements was moved for scanning purposes, the other two being in fixed relation to each other.

Figure 1:
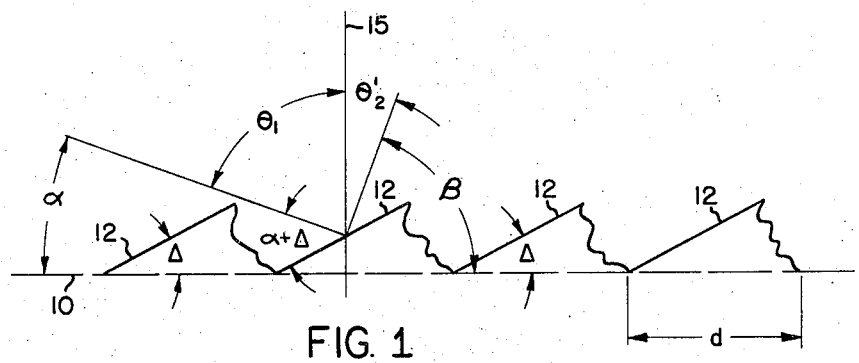
FIG. 1 is a schematic diagram illustrating, on a greatly enlarged scale, a fragmentary corss-section of a sharply blazed diffraction grating.

The principle underlying this aspect of the invention may be understood by reference to FIG. 1, which represents schematically a cross-section of a sharply blazed, reflective diffraction grating on a greatly enlarged scale. The line 10 represents the plane of, or tangent to the grating, and the angle, $\Delta$, between it and the burnished facets 12 of a representative groove is the blaze angle. The angle $\theta_1$, is the input angle, and the angle $\theta_2'$ is the angle between the specular direction and the normal 15 to the grating. The peak of the blaze lies in the specular direction. From the diagram of FIG. 1, bearing in mind the principle of elementary optics that the angle of reflection equals the angle of incidence, it may readily be seen that $\theta_2'$, which is the output angle at the peak of the blaze for radiation of any specified wavelength, differs by twice the blaze angle from $\theta_1$, the angle of incidence.

For any given input angle, $\theta_1$, radiation in a narrow band of wavelengths will be dispersed, in accordance with the grating equation, in the specular direction, $\theta_2'$. Conversely, for radiation of any given wavelength, there are an input angle and an output angle that satisfy both the condition for constructive interference and the specular condition. Thus, a blazed diffraction grating may be operated always at the peak of the blaze without sacrifice of spectral range.

When working with radiation at wavelengths where the reflectance of the grating is satisfactory for all angles of incidence, as in the visible spectrum, no further special considerations need be taken into account. However, when dealing with radiation of relatively short wavelengths, problems of reflectance are encountered such that heretofore only very low levels of efficiency have been achieved.

It has now been found that if the angle between the incident light and the reflecting facets of the grooves of the grating is kept smaller than the critical angle of total external reflection, the practice of the invention enables the achievement of heretofore unattainable spectrographic efficiencies. Additionally, when operated according to this feature of the invention, the grating discriminates with a high degree of effectiveness against energies of the second and higher orders, which have heretofore presented difficult problems.

Figure 2:
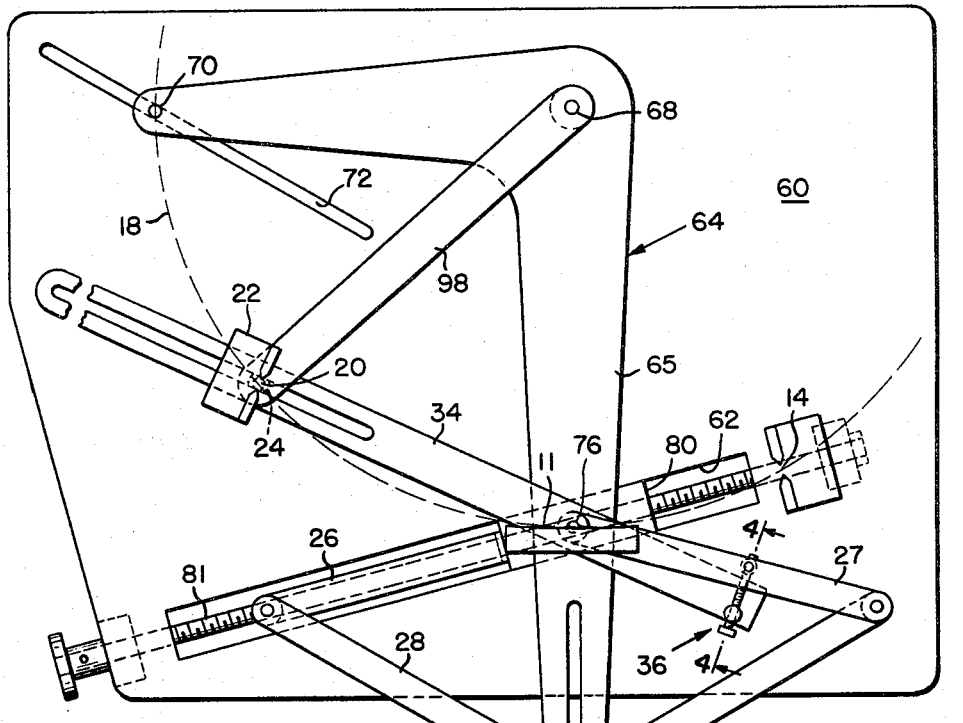
FIG. 2 is a side elevational view, in partly schematic form, and with certain supporting parts omitted for the sake of clarity, of a monochromator according to the present invention.
Figure 4:
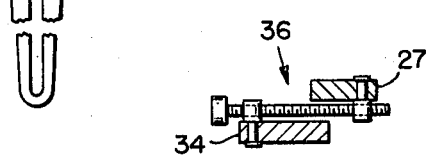
FIG. 4 is a fragmentary sectional view taken along the line 4—4 of FIG. 2.
Figure 3:
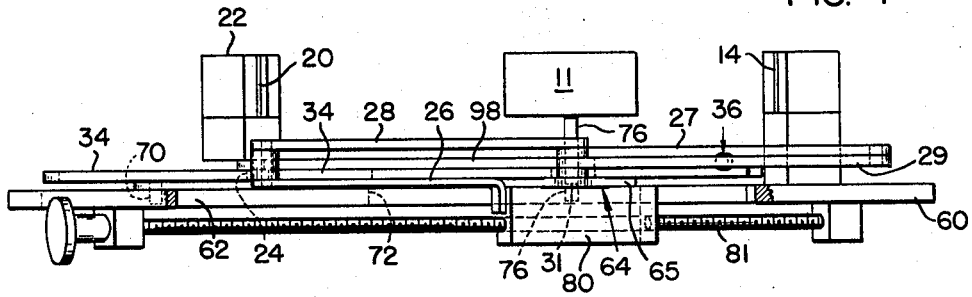
FIG. 3 is a bottom view of the monochromator shown in FIG. 2.

Referring now to the drawings, FIGS. 2 to 4 show a monochronomator arranged for operation in accordance with the present invention at the peak of the blaze. The structure shown is a modified form and makes use of the basic mechanical motion of the X-ray monochromator described and claimed by Neuhaus in U.S. Patent No. 3,123,710, and that patent may be referred to to implement the description herein. For convenience, the reference numerals used for designating corresponding parts of the monochromator in the drawings of this application are similar to those used in the Neuhaus patent.

The mechanical motion of the monochromator utilizes the geometrical theorem that states that the angle subtended by a chord at the circumference of a circle is exactly one half the angle subtended by the same chord at the center of the circle. As shown, two pivots 70 and 76 fixed on respective opposite arms of a bell crank 64 define the chord, and the apex 68 of the bell crank lies at the center of the Rowland circle 18. The pivots 70 and 76 are constrained to move along straight line paths angularly inclined to each other at an angle equal to one half the apex of the ball crank 64. The two paths are defined by respective elongated slots 62 and 72, respectively, in the main mounting plate 60. As the bell crank 64 moves with the pivots 70 and 76 so constrained, the apex 68 travels along a circular path centered upon the point of intersection of the two straight line paths. The primary slit 14 is fixed to the plate 60 at this point of intersection, which, by reason of the geometry is on the Rowland circle 18.

The grating 11 is spherically curved about a radius twice the radius of the Rowland circle 18. It is fixed to the bell crank 64 at the pivot 76 to lie always in osculation with the Rowland circle 18, and to move along the path defined by the guide slot 62. The pivot 76 is rotatably secured to a follower nut 80, which is driven back and forth along the slot 62 by a screw 81.

As so far described herein, the arrangement is generally similar to the X-ray monochromator described in the hereinabove identified patent. The bell crank 64 operates, in effect, to roll the Rowland circle through the primary slit 14 during the scanning action. As will now be described, the monochromator shown herein differs from the patented monochromator hereinabove referred to principally in its arrangement for controlling the position of the secondary slit 20 along the Rowland circle.

A modified parallelogram linkage (not generally designated) is pivoted on the pivot 76 directly in line with the center of the grating 11. One arm 26 of the linkage is fixed to the follower nut 80, and held in alignment with the drive screw 81. It is thus maintained always at the input angle relative to the grating 11. An auxiliary arm 27 of the linkage is also pivoted on the pivot 76, and is maintained by the linkage always symmetrically disposed to the first arm 26 relative to the grating 11.

The other two arms 28 and 29 complete the modified parallelogram linkage, and their common pivot 31 is constrained by a guideway 69 in the outer end of the arm 65 of the bell crank for travel along a straight path in alignment with the normal to the center of the grating 11.

The secondary slit 20 and the detector 22 are mounted on a common carriage 24, which is slidable along a secondary guideway 34. The secondary guideway 34 is also pivoted on the pivot 76. The guideway 34 is adjustably fixed to the auxiliary arm 27, as by the screw arrangement 36 illustrated, so that in operation it is held at a selected angle relative to the auxiliary arm 27.

The secondary slit 20 is maintained on the focal circle by a radius link 98, and its position along the circle is controlled by the motion of the auxiliary arm 34, which is driven through the modified parallelogram linkage. The angle between the auxiliary guide way 34 and the normal to the center of the grating 11 is the output angle and by the linkage just described, it is kept always different from the input angle by an adjustable angle, which, in the practice of the invention, is made equal to twice the blaze angle of the grating 11.

As so far described, the practice of the invention is of general utility and may be applied in all spectrographic work where blazed gratings are usable. Although the monochromator described herein includes a grating of the reflective type, the practice of the invention may be readily applied to instruments having transmitting type gratings simply by taking into account the angle of refraction instead of the angle of reflection. The principle remains the same. Two of the three basic elements of the instrument are moved so that, for each wavelength of interest, the condition for constructive interference, i.e., the grating equation, is satisfied at the peak of the blaze.

When, however, it is desired to work with energies at the wavelengths of so-called soft X-rays where the phenomenon of total external reflection is encountered, certain other limitations have been found to be also of importance, and certain unexpected advantages are achievable by the practice of the invention.

For efficient operation in this region of the spectrum, it is necessary to work at large input angles, i.e., the input radiation must strike the grating in a direction relatively close to the surface of the grating. This is called grazing incidence.

The classical grating expression, $$n\lambda = d(\sin \theta_1 \pm \sin \theta_2)$$

may be rewritten as follows for the grazing incidence case:

$$n\lambda = d(\cos \alpha - \cos \beta)$$

where $\alpha$ is the input angle measured from the grating surface, and $\beta$ is the output angle measured from the grating surface.

For small values of $\alpha$ and $\beta$, the first two terms of a series expansion provide a good first approximation for the bracketed cosine expression. Substituting, $$n\lambda = \frac{d}{2}(\beta^2 - \alpha^2)$$

approximately.

Referring again to FIG. 1, elementary geometry shows that at the peak of the blaze $\beta = \alpha + 2\Delta$. Substituting again, and reducing, $$n\lambda = 2\Delta d[\alpha + \Delta]$$

approximately.

This last equation expresses the practical condition for operating a grazing incidence monochromator at the peak of the blaze for each wavelength of interest.

In accordance with the invention as applied to grazing incidence spectroscopy, not only is the monochromator operated always at the peak of the blaze, but it is also arranged to take advantage of the phenomenon of total external reflection.

According to accepted theory, when radiation of any particular X-ray wavelength is directed upon a sufficiently smooth and flat surface, all of the radiation incident at angles below a certain critical angle is reflected with high efficiency, and very little of the radiation incident at higher angles is reflected.

According to classical theory the critical angle may be expressed as:

$$\epsilon = k\sqrt{N\lambda}$$

where:

$\epsilon$ is the critical angle, in radians,
$k$ is $2.992 \times 10^{-7}$
$N$ is the total number of electrons per cubic centimeter of the reflecting material, and
$\lambda$ is the wavelength of the incident radiation in centimeters.

Figure 5:
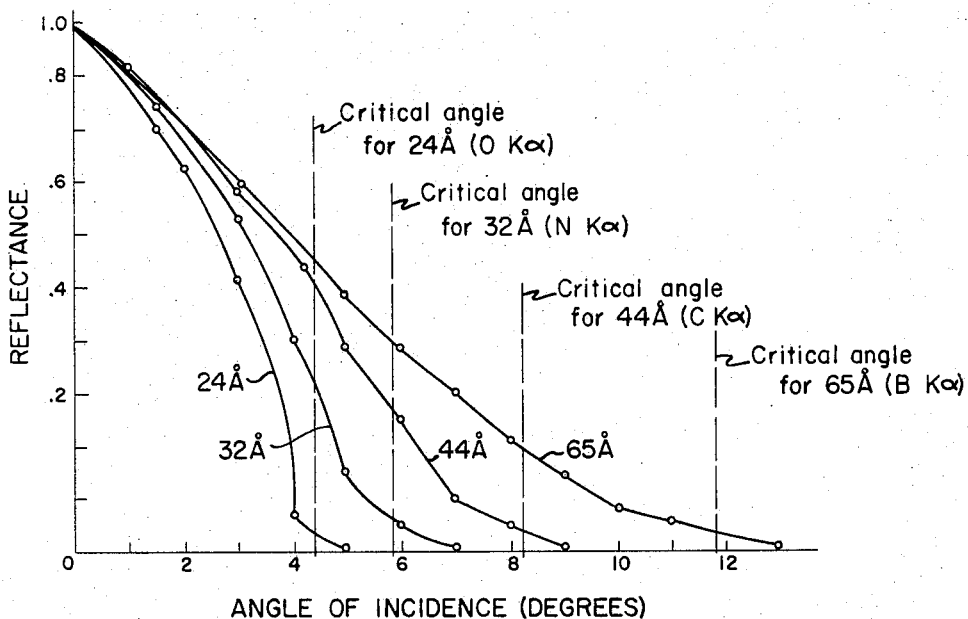
FIG. 5 is a chart showing the reflectance of aluminum oxide as a function of the angle of incidence for radiation of various different wavelengths.

In practice, the very sharp break, or discontinuity in the reflectance vs. angle of incidence curve is not achieved, because, it is thought, sufficiently smooth and flat surfaces have not been available. A more gradual change has been found to occur as shown by the chart of FIG. 5, which was published by Lukirskii in Optics and Spectroscopy, vol. XVI, No. 2, page 310 (1964). The chart shows the empirically determined reflectance of an aluminum oxide surface at various angles of incidence (measured from the surface) for radiation of 24 A., (oxygen K$\alpha$), 32 A. (nitrogen K$\alpha$), 44 A. (carbon K$\alpha$), and 65 A. (boron K$\alpha$). The calculated critical angles are noted along the abscissa. It is seen that the actual reflectance has been found to be about 2% to 4% at the critical angles, and about 40% to 70% at one-half the critical angles. It is believed that it will be possible to achieve higher reflectances in the future by developing methods of producing smoother and flatter surfaces than heretofore.

In accordance with the invention, in grazing incidence work, the angle between the incident radiation and the reflecting facets of the grooves is made smaller than the critical angle at each wavelength of interest. This condition may be expressed as, $$\alpha + \Delta = f\epsilon = fk\sqrt{N\lambda}$$

where $f$ is a constant less than one, preferably about one-half.

The selection of one-half for the value of $f$ is an arbitrary choice based largely on a compromise between the desire to maximize the reflectance of the grating and the need to discriminate against second order radiation of one-half the wavelength of the radiation it is desired to detect. The choice of a value for $f$ is not critical in the practice of the invention. As may be seen from the chart of FIG. 5, an increase in the value of $f$ increases the discrimination and reduces the reflectance, and hence the efficiency. Conversely, a reduction in the value of $f$ tends to reduce the discrimination and increase the reflectance.

The condition for operating always at the peak of the blaze in grazing incidence work then becomes, $$n\lambda = 2\Delta d f \epsilon$$

or $$n = 2\Delta d f k \sqrt{N}$$

which for a first order spectrum, where $n=1$, may be written, $$\Delta d = \frac{1}{2fk\sqrt{N}}$$

The more usual number, grooves per millimeter, $m$ can be substituted for $1/d$, to give the relationships $$\frac{\Delta}{m} = \frac{1}{2fk\sqrt{N}}$$

and $$f = \frac{1}{2k\sqrt{N}}\left(\frac{m}{\Delta}\right)$$

These last three equations are equivalent to each other.

They define the condition for operation always at the peak of the blaze and below the critical angle in grazing incidence spectroscopy. It is seen that to satisfy this condition, once the value of F is chosen, the product of the blaze angle and the distance between the grooves of the grating depends only on the material of which the grating is composed, and is independent of all other considerations. In the practice of the invention in grazing incidence work, the relationships between the groove frequency, the blaze angle, and the material of the grating surface must be selected approximately in accordance with the foregoing equations.

A few typical values of the blaze angle, $\Delta$, and the groove density, $m$, are shown in the following table for three different surface materials, taking $f$ as one-half.

| Blaze Angle | Grooves Per Millimeter | | | |
| --- | --- | --- | --- | --- |
| | 0.50° | 0.75° | 1.00° | 1.25° |
| Material: | | | | |
| Al$_2$O$_3$ | 266 | 398 | 531 | 664 |
| Au | 564 | 846 | 1,128 | 1,410 |
| Pt | 593 | 889 | 1,185 | 1,481 |

The basic equation for peak-of-the-blaze operation at grazing incidence, $n\lambda = 2\Delta d[\alpha+\Delta]$, taken with the condition that $\beta = \alpha + 2\Delta$ shows that in a grazing incidence monochromator according to the invention, both the input angle $\alpha$ and the output angle $\beta$ vary linearly as a function of wavelength. The dispersion of such monochromators is determined by the value of $2\Delta d$, and is independent of the groove frequency of the grating.

Figure 6:
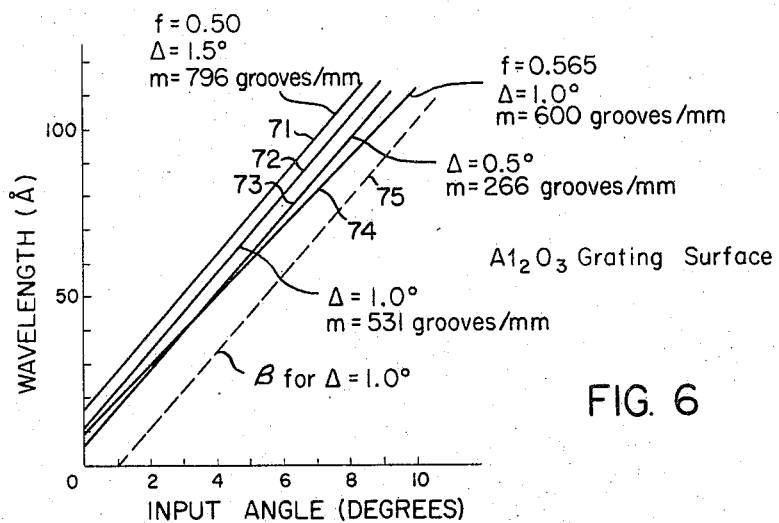
FIG. 6 is a chart showing the dispersion characteristics of various different grazing incidence monochromators of the invention, in each of which the diffraction grating has an aluminum oxide surface.
Figure 7:
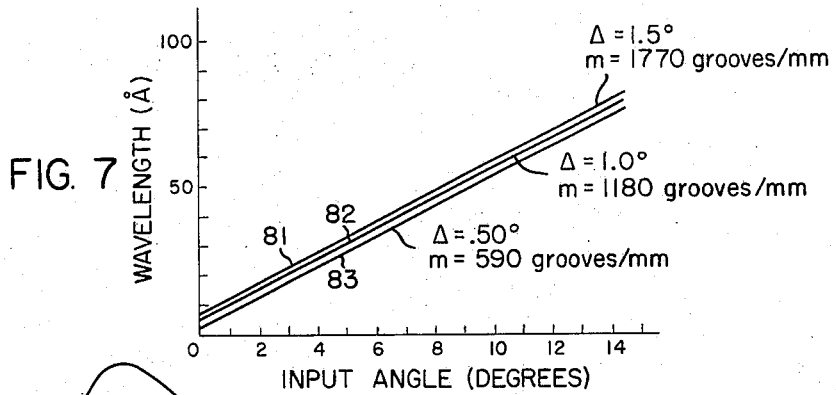
FIG. 7 is a chart similar to the chart of FIG. 7, but for monochromators having diffraction gratings of platinum.

Typical dispersion curves for grazing incidence monochromators of the invention are shown in FIGS. 6 and 7. In both of these figures the wavelength, $\lambda$, of the radiation received at the secondary slit is plotted on the ordinate as a function of the input angle $\alpha$, which is measured along the abscissa. The curves 71–74 of FIG. 6 show the dispersion characteristics for monochromators of the invention in which the surfaces of the gratings are of aluminum oxide. The curves 71, 72, and 73 show the dispersion in cases where the constant $f$ is chosen to be one-half, and the blaze angle $\Delta$ is selected to be, respectively, 1.5°, 1.0°, 0.5°. In these cases, to satisfy the conditions of the invention for optimum operation, the gratings must have, respectively, about 796, 531, and 266 grooves per millimeter. The curve 74 illustrates the dispersion in a case where the value of $f$ is chosen to be 0.565, and the blaze angle is 1.0°. In this case, the grating is ruled with 600 grooves per millimeter. The dashed line 75 is a plot of the output angle $\beta$ as a function of the input angle $\alpha$.

The curves 81–83 of FIG. 7 are similar in nature to the curves 71–74 of FIG. 6, but are based on gratings having platinum surfaces. In each case, the value of $f$ is chosen to be one-half. The values of the blaze angles, and the numbers of grooves per millimeter for each grating are shown by appropriate legends in the figure.

As a matter of practice, due to the need to allow for practical commercial tolerances in the manufacture of gratings, and because the principal grating manufacturer offers a list of stock gratings, a grating selected for use at grazing incidence according to the invention will usually not conform exactly to the desired specifications as determined from the foregoing equations. Instead, the spectroscopist will ordinarily select from stock a grating that conforms reasonably well, and then, if he desires, he can determine the value of $f$ empirically in the light of the actual properties of the grating.

Figure 8:
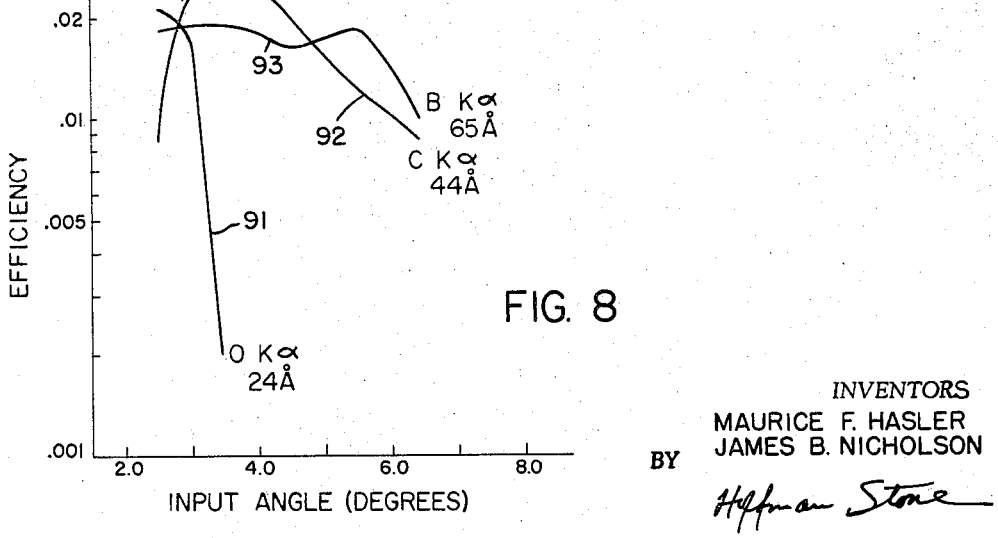
FIG. 8 is a chart showing diffraction efficiencies achieved experimentally in the practice of the invention in grazing incidence work.

Three empirically determined curves 91, 92, and 93 are plotted in FIG. 8 showing actual grating efficiencies achieved in the practice of the invention for radiation at three different selected wavelengths as indicated in the figure. The grating used was of the type known as an aluminized replica. It was spherically curved on a radius of one meter. It had 600 grooves per millimeter, and a blaze angle of 1°. An efficiency of about 3% was achieved for radiation at 44 A. wavelength, and about 2% for radiation at 24 A. and at 65 A. Efficiencies as high as 6% for radiation at 44 A. wavelength have been achieved in actual practice with other gratings of similar type.

The monochromator shown in FIGS 2–4 is suitable for use in the practice of all the embodiments of the invention, including both grazing incidence and high angle work. The invention, however, is not limited to the particular construction shown in the drawings, but contemplates primarily the method of controlling the spatial orientation of the primary and secondary slits, or field openings of whatever shape of a monochromator relative to the grating at each setting of interest regardless of the means used for accomplishing it, or whether it be done by hand adjustment.

What we claim is:

1. Method of operating a spectrographic instrument of the type including a sharply blazed diffraction grating, means defining an input angle, and means defining an output angle, both relative to the grating, the angles being in a plane generally normal to the rulings of the grating, said method comprising the step of adjusting the relative positions of the input means and the grating so that for each wavelength of interest the condition for constructive interference is satisfied at the peak of the blaze.

2. Method of operating a spectrographic instrument of the type including a sharply blazed diffraction grating, means defining a primary slit, and means defining a secondary slit, the slits being generally parallel to the grooves of the grating at all operative positions, said method comprising the steps of adjusting the relative positions of the grating and the slits so that for each wavelength of interest the condition for constructive interference is satisfied at the peak of the blaze, moving two of said grating, said primary slit means, and said secondary slit means relative to each other and to the third when shifting from one wavelength setting to another.

3. Method of operating a spectrographic instrument of the type including a sharply blazed reflective diffraction grating, means defining an input angle, and means defining an output angle relative to the grating comprising the steps of adjusting the relative positions of the grating, the input means, and the output means so that for each wavelength of interest the output angle differs from the input angle by twice the blaze angle of the grating, whereby the condition for constructive interference for each wavelength of interest is satisfied at the peak of the blaze.

4. Method of operating a spectrographic instrument of the type including a sharply blazed transmission diffraction grating, means defining an input angle, and means defining an output angle, both relative to the grating comprising the steps of adjusting the relative positions of the grating, the input means, and the output means so that for each wavelength of interest the output angle differs from the input angle by $(u-1)\Delta$, where $u$ is the refractive index of the grating, and $\Delta$ is the blaze angle of the grating, whereby the condition for constructive interference for each wavelength of interest is satisfied at the peak of the blaze.

5. Method of operating a grazing incidence spectrographic instrument of the type including a sharply blazed diffraction grating, means defining a primary slit, and means defining a secondary slit comprising the steps of adjusting the relative positions of the grating and the slits so that for each wavelength of interest the condition for constructive interference is satisfied at the peak of the blaze, and also so that radiation from the primary slit strikes the blazed facets of the grating at an angle smaller than the critical angle of total external reflection.

6. Method of operating a grazing incidence spectrographic instrument of the type including a sharply blazed diffraction grating, means defining a primary slit, and means defining a secondary slit comprising the steps of adjusting the relative positions of the grating, the primary slit, and the secondary slit so as to satisfy the following condition for each wavelength of interest:

$$n\lambda = 2\Delta d f \epsilon$$

where: $n$ is the spectral order,
    $\lambda$ is the wavelength,
    $\Delta$ is the blaze angle of the grating,
    $d$ is the grating constant,
    $f$ is an arbitrary constant smaller than 1, and
    $e$ is the critical angle of total external reflection for radiation of the wavelength incident on the grating.

whereby for each wavelength of interest the condition for constructive interference is satisfied at the peak of the blaze and radiation from the primary slit strikes the blazed facets of the grating at an angle smaller than the critical angle of total external reflection.

7. Method of operating a grazing incidence spectrographic instrument of the type including a sharply blazed diffraction grating, means defining a primary slit, and means defining a secondary slit comprising the steps of adjusting the relative positions of the grating, the primary slit, and the secondary slit so as to satisfy the following condition for each wavelength of interest:

$$f = \frac{1}{2k\sqrt{N}}\left(\frac{m}{\Delta}\right)$$

where:

$f$ is an arbitrary constant smaller than 1,
$k$ is $2.992 \times 10^{-7}$
$N$ is the number of electrons per cubic centimeter in the grating surface,
$m$ is the number of grooves 1 per millimeter in the grating, and $\Delta$ is the blaze angle of the grating.

whereby for each wavelength of interest the condition for constructive interference of the first order is satisfied at the peak of the blaze and radiation from the primary slit strikes the blazed facets of the grating at an angle smaller than the critical angle of total external reflection.

8. A spectrographic instrument of the scanning type comprising:
(a) a sharply blazed diffraction grating,
(b) means defining a primary slit,
(c) means defining a secondary slit,
(d) means defining a circle,
(e) means mounting said grating in osculation with said circle,
(f) means for mounting said slit means so that said circle passes through both of said slits at all operative positions of the instrument, and
(g) scanning means for producing relative motion along the circle between said grating and both of said slits,
    (1) the angle between the normal to said grating and the line of sight from said primary slit to said grating being the input angle,
    (2) the angle between the normal to said grating and the line of sight from said secondary slit to said grating being the output angle,
    (3) said scanning means being arranged to maintain a predetermined difference between said input and output angles at all operative positions of the instrument.

9. A spectrographic instrument of the scanning type comprising:
(a) a sharply blazed diffraction grating,
(b) means defining a primary slit,
(c) means defining a secondary slit,
(d) means defining a circle,
(e) means mounting said grating in osculation with said circle,
(f) means for mounting said slit means so that said circle passes through both of said slits at all operative positions of the instrument, and
(g) scanning means for producing relative motion along the circle between said grating and both of said slits,
    (1) the angle between the normal to said grating and the line of sight from said primary slit to said grating being the input angle,
    (2) the angle between the normal to said grating and the line of sight from said secondary slit to said grating being the output angle,
    (3) said scanning means being arranged to maintain a difference equal to twice the blaze angle of said grating between said input and output angles at all operative positions of the instrument.

References Cited

UNITED STATES PATENTS

| | | | |
|---|---|---|---|
| 3,069,966 | 12/1962 | White | 88—14 |
| 3,123,710 | 3/1964 | Neuhaus | 250—51.5 |
| 3,216,315 | 11/1965 | Keller | 88—14 |
| 2,377,133 | 5/1945 | Costa et al. | 250—50 |

RALPH G. NILSON, *Primary Examiner.*

ARCHIE R. BORCHELT, *Examiner.*

A. L. BIRCH, *Assistant Examiner.*